United States Patent [19]

Pfeiffer

[11] 4,266,693

[45] May 12, 1981

[54] PORTABLE FUEL AND OIL DISPENSER

[76] Inventor: N. Leonard Pfeiffer, 5313 Newton, Shawnee Mission, Kans. 66202

[21] Appl. No.: 47,131

[22] Filed: Jun. 11, 1979

[51] Int. Cl.³ .............................................. B67D 5/52
[52] U.S. Cl. ................................... 222/135; 222/173; 222/324; 222/385; 222/530; 239/375; 74/524
[58] Field of Search .............. 222/109, 135, 138, 142, 222/143, 173, 180, 320, 321, 385, 469, 472, 527, 530, 175, 538, 323, 324; 239/333, 375, 154; 224/48 R, 45 C, 48 E; 74/524–527

[56] References Cited

U.S. PATENT DOCUMENTS

| 996,775 | 7/1911 | Larson | 74/524 |
|---|---|---|---|
| 1,653,661 | 12/1927 | Riley | 222/143 |
| 1,915,343 | 6/1933 | Williams | 222/321 |
| 2,128,637 | 8/1938 | Davis | 222/385 |
| 2,510,972 | 6/1950 | Gray | 222/385 |
| 2,661,879 | 12/1953 | Lee et al. | 224/45 C |
| 3,047,329 | 7/1962 | Gunderson et al. | 224/48 R |
| 3,097,763 | 7/1963 | Aluotto | 222/135 |
| 3,745,762 | 7/1973 | Kocker et al. | 74/527 |

Primary Examiner—H. Grant Skaggs
Attorney, Agent, or Firm—Fishburn, Gold and Litman

[57] ABSTRACT

A portable fuel and oil dispenser for servicing chain saws and other portable engine driven equipment, includes a compact carrier for side-by-side containers holding different fluids such as fuel and oil. Pump assemblies which effect fluid transfer during an upstroke thereof and have features causing a straight line lifting of a pump piston rod extend into each of the containers for fluid transfer therefrom and respectively include leak protection features such as relief ports for backflow of fluid from the pump assembly into the container when fluid transfer is not required. Flexible delivery conduits such as hoses are connected to the pump assemblies for dispensing the fluids and remote ends thereof have nozzles with a check valve at an extreme tip end to prevent seepage and dripping of the fluid from the nozzle. Further, to prevent inadvertent operation of the pump assemblies, handles therefor are foldable and collapse downwardly and out of the way against the containers. For storage and carrying of the dispenser, a storage space for the hoses is provided between the side-by-side containers whereby the hoses are handily retained.

9 Claims, 5 Drawing Figures

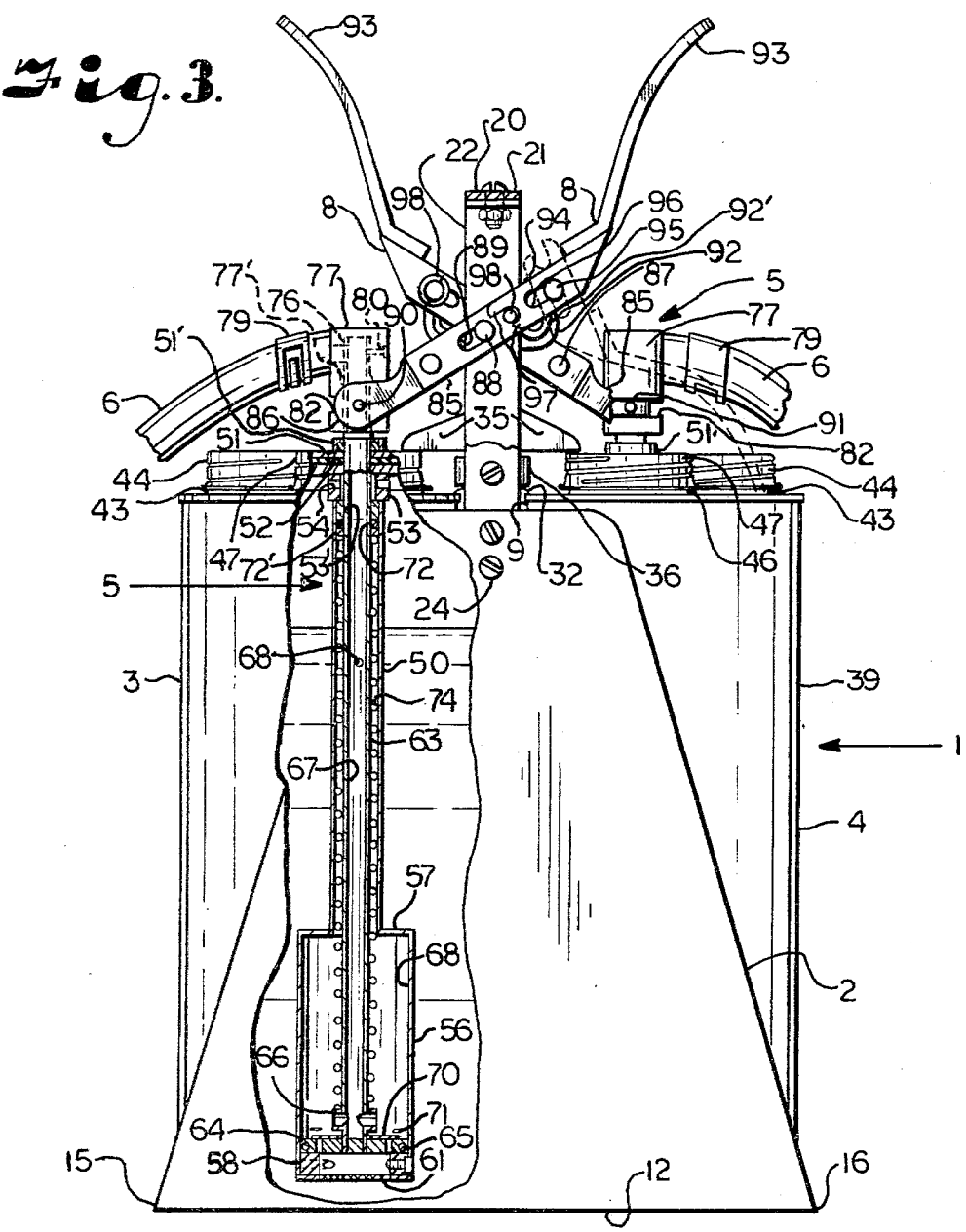
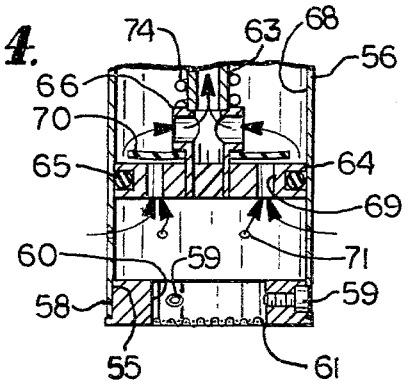
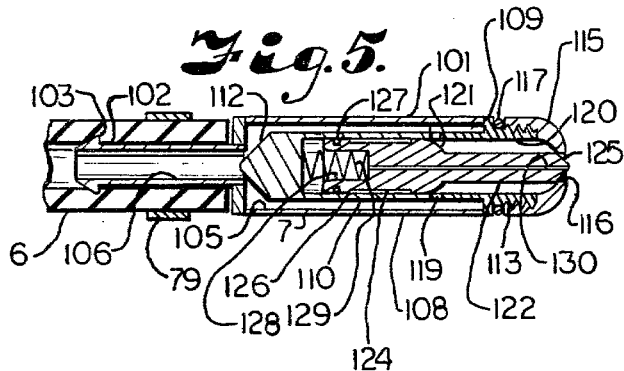

PORTABLE FUEL AND OIL DISPENSER

This invention relates to fluid pumping container and dispenser arrangements and particularly to such devices which are adapted for compact storage and ease of use.

When using equipment requiring servicing by two types of fluid, the servicing fluids must often be transported with the equipment for which they are intended. For example, a chain saw powered by a gasoline engine requires fuel for the engine and chain lubrication oil. Because the chain saw and other portable engine driven equipment is often carried by operators to remote locations, the servicing fluids therefor must also be transported. It is desirable to keep containers for the servicing fluids as neat and clean as possible and to prevent leakage of inflammable fluids carried thereby because of the danger of fire or explosion.

The principal objects of the present invention are: to provide a dispenser which carries quantities of different and separate liquids and is handy, easy to use, and portable; to provide such a dispenser having a pump assembly with pressure relief features permitting fluid to flow back into the container when the pump assembly is not in operation; to provide such a dispenser having a pump assembly having a straight lifting pump piston rod and an actuating handle arranged for causing said straight lifting; to provide such a dispenser having a flexible delivery conduit including a check valve at a nozzle end thereof which automatically closes to prevent seepage and leakage therefrom when the pump assembly is not operated; to provide such a dispenser having a foldable handle for the pump assembly which collapses downwardly and out of the way to prevent inadvertent operation of the pump assembly; to provide such a dispenser providing storage for flexible delivery conduits thereof; and to provide such a dispenser which is relatively inexpensive, highly reliable in use and well adapted for its intended purpose.

Other objects and advantages of this invention will become apparent from the following description taken in connection with the accompanying drawings wherein is set forth by way of illustration and example, a certain embodiment of this invention.

FIG. 3 is an elevational view of the portable fuel and oil dispenser having portions thereof broken away to show interior details thereof.

FIG. 4 is an enlarged, fragmentary view of a portion of a pump assembly of the portable fuel and oil dispenser.

FIG. 5 is an enlarged, fragmentary view of a flexible delivery conduit end and nozzle therefor of the fuel and oil dispenser.

Figure 1:
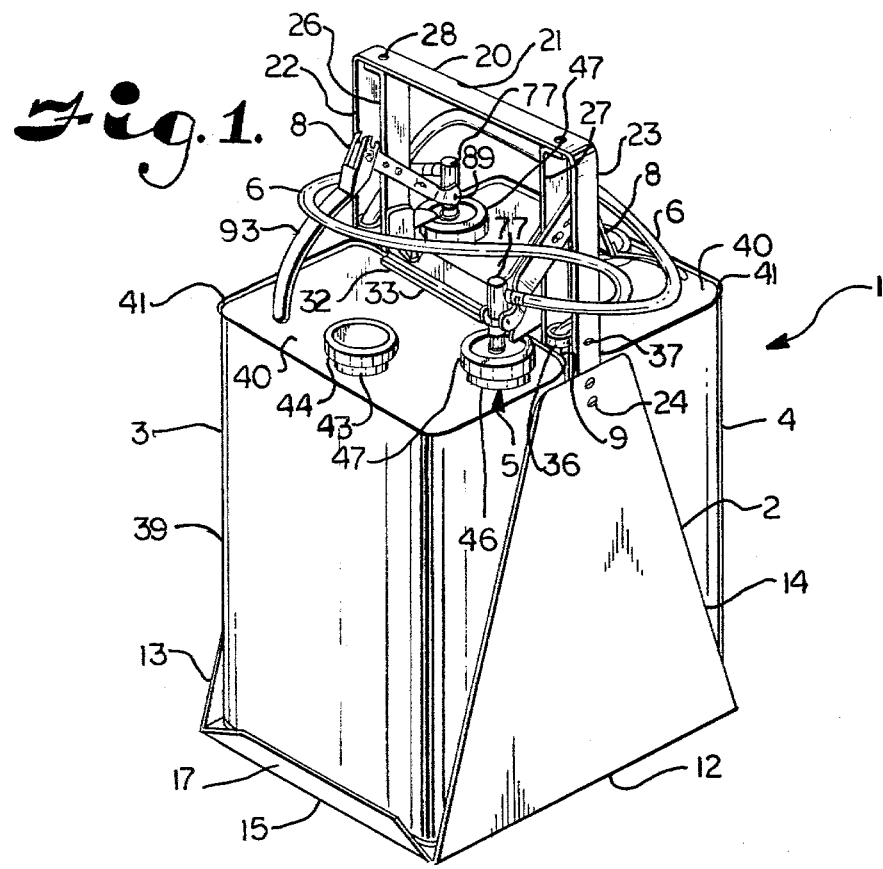
FIG. 1 is a perspective view of a portable fuel and oil dispenser embodying this invention and shown in a storage or carrying configuration.

As required, a detailed embodiment of the present invention is disclosed herein, however, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 designates a portable dispenser or apparatus with separate containers or chambers for different liquids and particularly adapted for containing fuel and oil in an easily transportable apparatus for carrying to remote areas and use in servicing portable engine driven equipment such as chain saws. The dispenser includes separate pumps and conduits for selective removal of liquid from the containers and delivery to the equipment being serviced. The dispenser has protective arrangements to prevent accidental operation of the pumps and dripping or seepage of liquid from the conduits when being transported or otherwise not operated for dispensing of the liquids.

In the structure illustrated the dispenser 1 has a support means or carrier 2 arranged for mounting side-by-side first and second containers 3 and 4 thereon as a unitary structure. The arrangement of the dispenser 1 permits use of thin-walled, relatively lightweight containers such as substantially conventional metal cans and includes members positioned to prevent or inhibit warping or "oil canning" flexing of the container walls during operation of pump means connected thereto. Each of the containers 3 and 4 includes a pump means such as a pump assembly 5 for delivering fluid from the containers 3 and 4 and to equipment to be serviced. The dispenser 1 includes leak-protection features for, among other things, pressure relief and fluid return to the containers 3 and 4 as described below. Delivery conduit such as hoses 6 is connected to the pump assemblies 5 and nozzles 7 fitted to ends thereof have respective valves therein to prevent seepage and leakage of fluid from the nozzles 7. Pump handles 8 are foldable and collapse downwardly and against the respective containers 3 and 4 for out-of-the-way storage whereby inadvertent operation of the pump assembly 5 is prevented. A storage means 9 for the hoses 6 is provided between the containers 3 and 4 to provide a compact, portable dispenser unit.

In the illustrated example, the support structure or carrier 2 has a planar bottom portion 12 with opposed, upwardly extending side members 13 and 14 respectively having converging edges which form generally triangularly shaped members. Opposite ends 15 and 16 of the bottom portion 12 have upwardly turned flanges or lips 17 which engage and hold the containers 3 and 4 on the bottom portion 12.

A handle means 20 for grasping and carrying the dispenser 1 is suitably secured to the carrier 2 is in the illustrated example, is in the shape of an inverted "U" that also provides support for operating levers of the pump assemblies 5. A central bar portion 21 extends transversely or between the side members 13 and 14 and has arms 22 and 23 which extend downwardly and terminate in respective ends suitably secured to the side members 13 and 14, as by fasteners 24.

Figure 2:
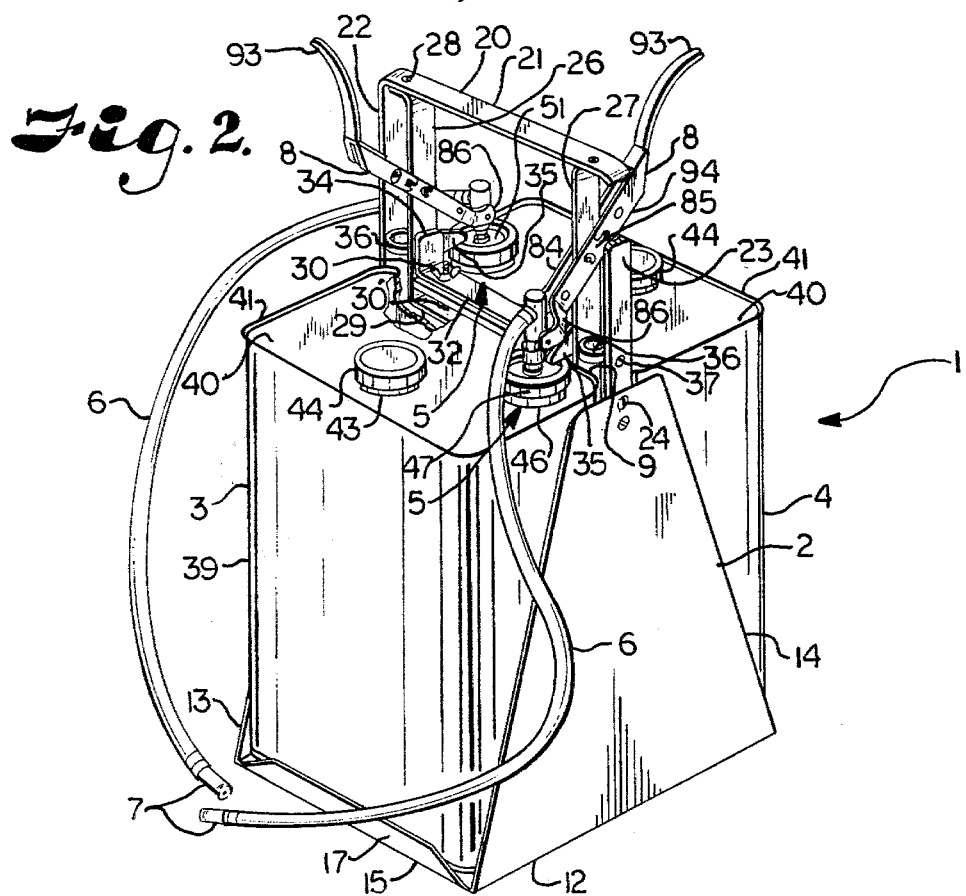
FIG. 2 is a perspective view of the portable fuel and oil dispenser in a ready-to-use configuration.

Extending between the arms 22 and 23 of the handle 20 is a container engaging means for mounting the containers 3 and 4 to the carrier 2 and which, in the illustrated example, includes spaced arms 26 and 27 generally in a "U" shape and positioned between the arms 22 and 23 and suitably connected to and depending from the central bar portion 21, as by fasteners 28. Lower end portions of the arms 26 and 27, FIG. 2 are connected to a cross bar 29 spaced below the central bar portion 21 and between the containers 3 and 4 providing a space dividing same. The exemplary dispenser 1 includes a removable clamp member 32 adapted to be pressed down upon the containers 3 and 4 and has spaced apart downwardly extending flanges 33 thereon for engaging portions of the upper part of the respective containers 3 and 4 to prevent outward movement thereof. The clamp member 32 is positioned in overlying relation to the cross bar 29 and is adjustably fastened thereto as by fasteners 30 for controlling the clamping pressure on the containers 3 and 4. A coil spring member 30' urges the clamp member 32 upwardly against the fasteners 30 for aid in removing the clamp member 32 when necessary. In the illustrated example, opposite ends of the clamp member 32 have upwardly extending tab portions 34, FIG. 2, respectively having a projecting arm or spur 35 extending therefrom in an opposite direction to the other spur; that is, one spur 35 extends toward the container 3 and the other spur 35 extends toward the container 4 for use as described below.

The storage means for the flexible delivery conduits or hoses 6 comprises, in the illustrated example, a pocket or space 9 between the containers 3 and 4 and holders such as rings 36 positioned between the containers and between arms 22 and 26 and arms 23 and 27 and suitably secured thereto as by fasteners 37 for providing rigid connectors between the respective arms and receiving the hoses 6 at least partially between the containers 3 and 4 in a compact, readily removable relation.

The containers 3 and 4 are arranged in compact relationship such as side-by-side on the carrier bottom portion 12 for ease of storage and carrying and, in the illustrated example, are rectangularly shaped and enclosed with sidewalls 39 extending therearound and a top wall 40 having a lip 41 around the margin thereof providing a purchase for the clamp member flanges 33. Filling ports 43 extend through the top wall 40 and are positioned adjacent the sidewall 39 of each of the containers 3 and 4 and are suitably closed as by a removable cap 44. A second port 46 adjacent a respective corner of the containers 3 and 4 has a cap 47 in the form of a ring with a central opening for a purpose described below removably closing same.

The pump assemblies 5 are operable to move fluid from the containers 3 and 4 to the article to be serviced, and in the illustrated example, respectively extend through the ports 46 into the respective containers 3 and 4 and include an elongate, rod-like pump body 50, FIG. 3, having a hollow interior. The pump assemblies 5 include working members, described below which reciprocate up and down and can exert considerable upward pressure on the portion of the top wall 40 surrounding the ports 46. To resist this upward pressure tending to cause buckling and deformation of the top wall 40, each spur 35 is positioned in overlying relation to the caps 47 and thereby provides a stop against upward movement. An upper end of the pump body 50 extends through the cap 47 and has a disc-shaped flange or retainer 51 secured thereto and engaging between a rim of the port 46 and the cap 47 and having an outer seal retainer member 51', described below, coaxially positioned therein. A ring seal 52 also therebetween provides a leak-free connection. An upper head portion 53 on the pump body 50 situated within the container 3 or 4 adjoins the flange or retainer 51 and has ports 54 therethrough open to the interior of the container 3 or 4.

A lower end of the pump body 50 is connected to an enlarged, cylindrical, chamber member 56 having a flange portion 57 and an open lower end portion 55 with an annular inner ring member 58 mounted therein as by fasteners 59. The ring member 58 has a central opening 60 covered by a screen 61 to filter and admit fluid into the chamber member 56.

A pump rod 63 having an interior passageway 67 therethrough is movably mounted within the pump body 50 for reciprocal movement and has a sealed lower end connected to a piston portion 64 having a ring seal 65 therearound sealably engaging the piston portion 64 to an interior wall surface of the chamber member 56. Pressurized fluid enters the pump rod 63 via an inlet head 66 adjacent the piston portion 64 and travels upwardly through the interior passageway 67 for delivery to the equipment to be serviced.

An air bleed port 68 extends through the wall of the pump rod 63 and allows exit of air to bleed the pump. The air bleed port 68 is situated to remain below the upper head portion 53 when the pump rod 63 is at its uppermost point of travel or throw.

The chamber member 56 encloses a compression chamber 68 wherein the flange portion 57 is fixed in position and the piston portion 64 is movable to force the fluid into the inlet head 66 and through the pump rod 63. In the illustrated example, to admit fluid into the compression chamber 68, a plurality of apertures 69 extend through the piston portion 64. A flexible, disc-shaped flapper valve 70 is sleeved on the pump rod 63 between the piston portion 64 and the inlet head 66 and is responsive to downward movement of the piston portion 64 to admit fluid through the apertures 69 and responsive to upward movement to seat against the piston portion and seal the apertures 69 and prevent fluid exit through the apertures 69. Apertures 71 of relatively small diameter extend through the cylindrical portion 56 adjacent the ring member 58 to permit entrance of fluid should the screen 61 become excessively clogged and also permit outflow of fluid to lessen any risk of leakage when the pump assembly 5 is not operated.

At an upper portion, the pump rod 63 extends through the outer seal retainer member 51' which, in the illustrated example, includes an interior annular seal that permits passage of air therethrough. Preferably, the interior annular seal is formed of a material, such as felt, that permits the respective container 3 or 4 to breathe; that is, permit passage of air upon expansion and contraction of the container. The felt seal material also acts as a dust or grip wiper to clean away any abrasive material from the pump rod 63 as the rod enters the container. By permitting said breathing, the felt seal allows the container to stay at ambient atmospheric pressure.

Air enters and leaves the respective container 3 or 4 through the ports 54 in the upper head portion 53. The piston rod 63 reciprocably extends through the upper head portion 53 and, in the illustrated example a bearing surface 53' situated below the ports 54 acts as a guide for the rod 63. A ring seal 72 and washer member 72' is sleeved on the pump rod 63 below and adjacent to the upper head portion 53 whereby the ring seal 72 wipes away any fluid on the surface of the pump rod 63 as the same travels through the upper head portion 53 and provides an upper seal between the pump body 50 and the pump rod 63. In the event of any possible leakage or seepage past the piston rod ring seal 72, the fluid passes along the bearing surface 53' and a cavity adjacent the relief ports 54 and exits through the relief ports 54 and is not trapped within the upper head portion 53, thereby further reducing any risk of external leakage.

A resilient member such as a coil spring 74 is positioned within the pump body 50 and in the illustrated example, surrounds the pump rod 63 between the inlet head 66 and the washer member 72' adajcent the upper head portion 53 for biasing the piston portion 64 to an extended position abutting the inner ring 58.

An upper portion of the pump assembly 5 extends upwardly of the container top wall 40 through the cap 47 and has an upper end 76 affixed such as by a fastener 80 to a pump outlet fitting 77 having an internal O ring seal 77' and for connection to the hose 6 and secured thereto as by a clamp 79. The pump rods 63 are rotatable about respective longitudinal axes thereof within the pump bodies 50 and, as shown in FIGS. 1 and 2, the upper ends 76 swivel for movement of the hoses 6. The outlet fitting 77 is adapted for connection to the pump handle 8 and, in the illustrated example, a groove 82 extends annularly around the outlet fitting 77 for receipt of a connector of the pump handle 8 as described below.

The pump handles 8 are suitably mounted for up and down swinging movement to lift and lower the pump rod 63. Each pump handle 8 is hingedly connected to the respective arms 26 and 27 and has spaced levers or arms 84 and 85 with curved arm ends forming a fork 86. The arms 84 and 85 are rigidly secured together as by a pin 87 and swingably mounted to one of the arms 26 and 27 as by a pivot pin 88. Elongate hinge slots 89 through the arms 84 and 85 receive the pin 88 and thereby allow the arms to move back and forth as necessary when the handle 8 is moved up and down to operate the pump plunger and permit linear movement thereof without any lateral force thereon. The handle 8 is suitably connected to the outlet fitting 77 and in the illustrated example, a ring segment or yoke 91 is pivotally mounted to the fork as by pins 90 and is received in the groove 82 of the outlet fitting 77.

To cause said linear movement without any lateral force thereon, a tang member 92 extends outwardly from midportion of the respective arms 26 and 27 and generally between the pump handle arms 84 and 85. A guide link 92' is pivotally connected at one end thereof to the tang member 92 and has another end pivotally connected to a pivot pin 95 extending through the spaced arms 84 and 85 whereby the guide link 92' swings upwardly and downwardly relative to the tang member 92 and positively guides the pump handle arms 84 and 85 in forward and rearward lateral movement. As the pump rod 63 moves up and down, or linearly, the handle 8 moves laterally and would otherwise impart lateral movement or bending to the pump rod 63 but for lateral movement accommodating and promoting portions of the handle 8 which positively control the lateral movement of the handle 8. The guide link 92' is of a selected distance between the pivot points thereof which, when combined with the lateral distance between the pivot point between the guide link 92' and the tang member 92 and the pivot point at the pin 88 substantially equals the distance between the pin 88 and the pins 90.

The guide link 92' as it swings up and down during pumping movement of the handle 8, pulls and pushes the handle 8 back and forth so that the elongate hinge slots 89 move relative to the fixed pivot pin 88, thereby causing a positively controlled linear lift of the pump rod 63 during the entire throw or travel thereof.

A handle lever 93 is foldably connected to the arms 84 and 85 for collapsing downward toward the container 3 or 4 thereunder for compact storage and to guard against or prevent inadvertant operation and any possible resultant seepage or leaking. In the illustrated example, the handle lever 93 includes a bifurcated portion 94 providing spaced fingers 97 and is swingably connected to outer ends of the arms 84 and 85 as by a pivot pin 95 positioned for slidable receipt in an elongate or slot opening 96. The upper of the spaced fingers is of sufficient length whereby, when the handle lever 93 is pulled rearwardly, the upper finger still abuts the pin 95 and prevents the handle lever 93 from folding upwardly. The spaced fingers 97 of the bifurcated portion 94 removably receive a pin 98 protruding from each of the arms 84 and 85 whereby the handle lever 93 is swung upwardly and pushed forwardly, FIG. 3, to engage the fingers 97 with the pin 98 and effect a rigid extension of the arms 84 and 85. In the illustrated example, a forward portion of the slot opening 96 has a countersunk or beveled peripheral edge and a resilient, bowed washer member 99 suitably connected to the pivot pin 95 bears against the beveled edge of the forward portion of the slot opening 96 to resiliently retain the handle lever 93 in a selected forward or engaged position. Conversely, to fold the handle lever 93 relative to the arms 84 and 85, the handle lever 93 is moved rearwardly and against the resistance of the washer member 99 whereby the spaced fingers 97 disengage from the pin 98 and the handle lever 93 is free to swing on the pivot pin 95 and fold or collapse downwardly and out of the way. Preferably the handle lever 93 is curved to fit the user's hand for ease of grasping. In the illustrated example, the length of the handle 8 is such that a three to one lever advantage is provided.

In the illustrated example, the nozzles 7 respectively have valves therein which close when the pump assemblies 5 are not operated and thereby prevent seepage or leaking from the hoses 6. The nozzles 7 are connected to respective free ends of the hoses 6 and include a body member 101, FIG. 5, having a protrusion end 102 with a hose engaging ridge portion 103 received within the hose 6 and suitably secured thereto as by a clamp 79. The body member 101 is cylindrical in shape and has a hollow interior 105 communicating with a passage 106 through the protrusion end 102.

The body member 101 has an outer wall 108 with a forward end portion 109 joined to an inner cylindrical receptacle 110 coaxially positioned within the hollow interior 105. The cylindrical receptacle 110 has a rear end portion 112 which is preferably conically shaped and projects toward the passage 106 to distribute fluid flow within the hollow interior 105 for surrounding the cylindrical receptacle 110. In the illustrated example, the body member 101 has a forward end portion 113 which is suitably threaded for receipt of an end cap 115 with an orifice 116 for passage of the fluid. A seal 117 surrounds the forward end portion 113 between the body member 101 and the end cap 115 for fluid-tight connection.

A plurality of ports 119 extend through the cylindrical receptacle 110 for flow of fluids from the hollow interior 105 of the body member 101 to a hollow interior 120 of the cylindrical receptacle 110 and are positioned generally next to a sloping shoulder portion 121 of a pressure responsive plunger 122 slidably mounted within the hollow interior 120 of the cylindrical receptacle 110. In the illustrated example, the plunger 122 includes a body 124 having a conical tip end 125 and a piston end 126 having a seal 127 therearound. A socket 128 extends coaxially into the piston end 126 for receiving a spring 129 which extends between the plunger 122 and the rear end portion 112 of the cylindrical receptacle 110, thereby urging the plunger 122 forwardly whereby the tip end 125 seats against the end cap 115 to close off the orifice 116 to prevent fluid seepage and leakage therefrom. A vent passage 130 extends longitudinally through the plunger 122 from the socket 128 to the tip end 125 and provides venting for movement of the plunger 122.

Thus, when fluid under pressure is not supplied to the nozzle 7 or when the pressure drops to an amount below the force exerted by the spring 129, the spring 129 moves the plunger tip end 125 outwardly for seating against the periphery of the orifice 116 in the end cap 115 and at the extreme end of the nozzle 7 and close same, thereby eliminating any possible when closed from the tip of the nozzle 7 and further acting as a pump discharge check valve. When pressurized fluid is supplied to the nozzle 7 via the hose 6, the fluid travels through the passage 106 and into the body member hollow interior 105. The fluid flows through the ports 119 and into a forward end of the hollow interior 120 of the cylindrical receptacle 110 and exerts rearward pressure on the sloping shoulder portion 120 of the plunger 122 and overcomes the pressure of the spring 129 to move the plunger 122 rearwardly within the cylindrical receptacle 110 and the conical tip end 125 away from the end cap 115, thereby automatically opening the orifice 116 for flow therethrough. Centrifugal force applied to the nozzle 7, as by whipping the end of the hose 6 will not cause the plunger 122 to retract but only cause the plunger 122 to seat even tighter against the orifice 116, thereby further eliminating any possible leakage. The biasing pressure of the spring 129 may be selected by removal and replacement of the spring and in the present example is set at approximately five pounds.

In a storage or carrying configuration, FIG. 1, the portable fuel and oil dispenser 1 is compact and has numerous safety and leak-free features described above which prevent inadvertent actuation of the pump assemblies 5 and inhibit seepage and leaking from the hoses 6 to keep the dispenser 1 clean. In said storage or carrying configuration, the handle levers 93 are folded or collapsed downwardly relative to the arms 84 and 85 and are thereby out of the way to prevent inadvertant operation during carrying.

The hoses 6 are wrapped around the handle 20 such as shown in FIG. 1 and passed through the rings 36 for storage in the space 9 between the containers 3 and 4. Further, in said storage or carrying configuration, the pump piston portion 64 and pump rods 63 are moved downwardly, exposing the apertures 71 for backflow of fluid through the hoses 6 and return to the containers 3 and 4 whereby the fluid is not maintained in a pressurized conduction when the pump assemblies 5 are not operated. Additionally, the nozzles 7 are automatically closed to prevent seepage or leaking from the orifice 116. The caps 44 are easily removed for access to the respective containers 3 and 4 for filling same with, for example gasoline in one of the containers and lubricating oil in the other container for servicing a chain saw. Accordingly, the containers 3 and 4 may be color coded to indicate the type of fluid therein such as red for the container housing the gasoline or fuel in accordance with fire department suggestions and regulations and such as green for the oil container.

Alternatively, the fuel and oil dispenser 1 may be used for servicing two cycle engines wherein one of the containers 3 or 4 may contain gasoline and the other container may contain a motor oil for mixing with the gasoline in a fuel tank for the engine. In this use, the gasoline could be pumped directly into the fuel tank and an amount of motor oil, as measured by strokes of the pump handle lever 93 could be supplied to the gasoline in a recommended proportion thereof.

In a use configuration of the fuel and oil dispenser 1, FIG. 2, the hoses 6 are pulled form the storage space 9. The handle levers 93 are readied for operation by swinging same upwardly and moving forwardly until the respective lever 93 locks with the handle arms 84 and 85. The pump assemblies 5 are then operated in the usual manner to pump fluid from the containers 3 and 4 and through hoses 6. When the pressurized fluid reaches the nozzles 7, the plungers 122 move rearwardly to open the orifices 116 and permit flow of fluid therethrough to the equipment or article to be serviced.

Upon completion of use, the hoses 6 are stored as described above and the pump handle levers 93 folded downwardly to reconfigure the fuel and oil dispenser 1 for storage or carrying as described in connection with in FIG. 1.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A portable dispenser arrangement for providing selected amounts of different fluids and comprising:
   (a) a carrier having a base portion, opposite side portions extending upwardly therefrom and a handle extending between said side portions;
   (b) first and second enclosed containers for respectively holding different fluids therein and mounted on said carrier base portion in upright, side-by-side relation and between said side portions;
   (c) said containers respectively having filling ports for receiving different fluids therein;
   (d) a clamp member removably extending between said side portions and engaging said containers for retaining said containers on said carrier;
   (e) a pump means having a pump body extending downwardly into each of said containers and having a pump rod with an outlet portion and reciprocably mounted in said pump body and including a lower piston portion, said pump means being operable to move said fluid from said container;
   (f) ports in said pump body for exit and relief of pressurized fluid therefrom when said pump means is not operated;
   (g) flexible delivery conduits connected respectively to said pump rod outlet portions and having free ends;
   (h) nozzles respectively connected to said delivery conduit free ends for flow of fluid therefrom and including valve means in said nozzles responsive to pressure for automatically opening and permitting flow of fluid therefrom and means automatically closing in response to a drop of said pressure to prevent seepage of said fluids from said nozzles;
   (i) pump handles respectively pivotally connected to said carrier handle for reciprocably moving said piston rod in said pump body;

(j) a lever arm selectively foldably connected to said pump handle and movable from a position rigid therewith for operating said pump means to a position folded relative thereto for compact storage and carrying of said dispenser; and (k) a holder on said carrier for at least partly receiving said delivery conduits for compact storage and carrying of said dispenser.

2. A pump assembly for a fluid dispenser container comprising:

(a) a pump body extending into an interior of a container and having an internal passage including an end with a pump piston receiving chamber;

(b) a pump rod having an internal passage movably mounted for longitudinal reciprocation therein and having a piston portion mounted to a lower end thereof with an inlet port adjacent said piston portion communicating with the passage in said pump rod for entry of fluid into said pump rod;

(c) said piston portion including at least one passage therethrough for drawing fluid from said container into said piston chamber and having closure means operable to open and close said passage in response to pressure differentials thereacross whereby an upstroke of said pump rod and piston portion causes transfer of fluid;

(d) said pump body having a head portion disposed from said chamber including guide means and a seal surrounding said pump rod, said head portion having a port extending generally transversely therethrough and spaced beyond said seal and communicating with the interior of said container and the internal passage of said pump body for permitting any possible fluid leaking past said seal to drain into said container; and (e) a pump discharge valve operably connected to the internal passage of said pump rod for selectively closing said internal passage.

3. The pump assembly set forth in claim 2 including:

(a) a pump bleed port extended generally transversely through said pump rod for permitting any air in said piston receiving chamber to bleed from the internal passage of said pump rod.

4. The pump assembly set forth in claim 3 including:

(a) a plurality of ports extending generally transversely through said piston receiving chamber and communicating with the interior of said container when said pump assembly is not operated for relief of any fluid under pressure in said piston receiving chamber.

5. The pump assembly set forth in claim 4 including:

(a) a delivery conduit connected to the internal passage of said pump rod for flow of fluid therethrough and having a free end remotely positioned from said pump rod; and wherein (b) said pump discharge valve is a nozzle connected to said free end and having valve means therein responsive to pressure for automatically opening and permitting flow of fluid therefrom and automatically closing in response to a drop of pressure of said fluid to prevent seepage of fluid from said nozzle.

6. A portable dispenser apparatus for selectively dispensing different fluids and comprising:

(a) a carrier having a handle means medially positioned thereon;

(b) first and second containers mounted on said carrier with said handle means generally upstanding therebetween;

(c) a pump means connected to each of said containers and respectively having a pump actuation handle pivotally mounted to said handle means for support thereof;

(d) a delivery conduit leading from said pump means for use in routing fluids to an article to be serviced; and (e) storage means positioned generally between said containers for receipt of said delivery conduit when not in use.

7. The dispenser apparatus set forth in claim 6 wherein:

(a) each of said pump means includes a pump body extending downwardly into each of said containers and having a pump rod movably mounted in said pump body and with a pump outlet connected to said pump rod for moving said fluid under pressure through said delivery conduit when said pump handle is actuated; and including (b) pressure relief means including ports in said pump body for flow of fluid therefrom into said container.

8. The dispenser apparatus set forth in claim 6 wherein:

(a) said pump handle includes a center portion having a pivot therein for folding of said pump handle relative to said handle means and a locking means including bifurcated arm ends and a pin for affixing said pump handle in an extended position relative to said handle means.

9. The dispenser apparatus set forth in claim 6 wherein:

(a) said delivery conduit includes a nozzle with a valve means therein; and (b) said valve means having an internal spring responsive to fluid pressure to automatically move a valve closure member.

* * * * *